F. W. MERRICK.
LASTING MACHINE.
APPLICATION FILED OCT. 2, 1916.

1,301,726.

Patented Apr. 22, 1919.
6 SHEETS—SHEET 1.

Fig. 1.

Witness:
Oscar F. Hill

Inventor:
Frank W. Merrick
by Chas. F. Randall
Attorney.

UNITED STATES PATENT OFFICE.

FRANK W. MERRICK, OF BOSTON, MASSACHUSETTS, ASSIGNOR TO UNION LOCK STITCH COMPANY, OF BOSTON, MASSACHUSETTS, A CORPORATION OF MAINE.

LASTING-MACHINE.

1,301,726.

Specification of Letters Patent.   Patented Apr. 22, 1919.

Application filed October 2, 1916.   Serial No. 123,216.

*To all whom it may concern:*

Be it known that I, FRANK W. MERRICK, a citizen of the United States, residing at Boston, in the county of Suffolk, State of Massachusetts, have invented a certain new and useful Improvement in Lasting-Machines, of which the following is a specification, reference being had therein to the accompanying drawings.

The invention has relation to end-lasting mechanism, such, for instance, as that usually comprised in machines of the bed-lasting machine type.

The invention comprises novel end-lasting mechanism, primarily intended for toe-lasting. One of the features of the invention consists in a flexible wiping-band, which for use is combined removably with the wiper-devices of an end-lasting mechanism, and when the upper has been wiped into place against the shoulder of the insole the said band is fastened in place upon the shoe so that it remains connected with the latter and serves as a toe-binder. The invention includes an improvement in the method of lasting, consisting in employing a removable, flexible, wiping-band as the working face of the wiper devices of a lasting machine, and by means of the said band wiping the shoe-upper into place around the end of the last and over upon the bottom of the last; then fastening the said wiping-band to the shoe so that it constitutes a binder for the shoe upper; and then permitting it to remain attached to the shoe as a binder until it is detached therefrom after further progress in the process of manufacture has been made. Other features of the invention consist in novel toe-band and girth-wiper devices.

The mechanical features of the present invention are shown in the accompanying drawings embodied in connection with certain parts of a lasting machine on the order of that shown and described in my application for U. S. Letters Patent, filed April 28, 1913, Serial No. 764,005. The said drawings represent only such parts of a lasting machine substantially like that of the said application as are required for a correct understanding of the present invention. The invention is not necessarily restricted to employment and reduction to practice in the particular machine of the said application; nor are the principles of the invention restricted to embodiment and reduction to practice in the precise form and manner illustrated in the drawings hereof.

Figure 2:
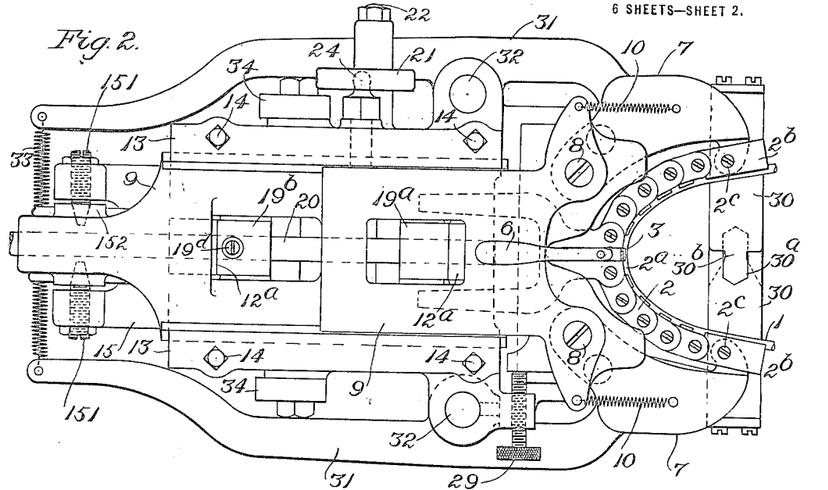
Fig. 2, Sheet 2, is a plan view on an enlarged scale of the toe-lasting devices of Fig. 1, with small portions broken away at the left-hand side for want of room.
Figure 3:
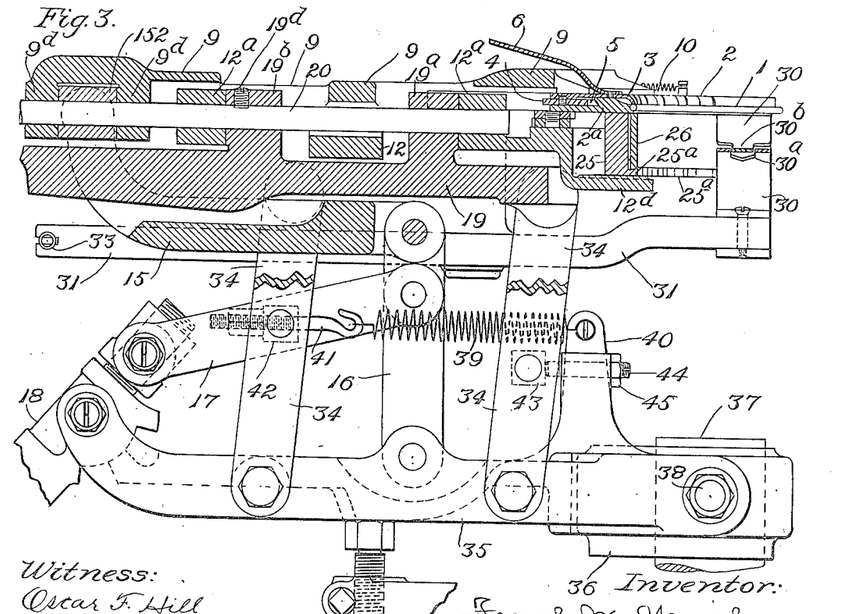
Fig. 3, Sheet 2, is a view of the said devices, partly in side elevation and partly in devices, looking at the inner end thereof.
Figure 4:
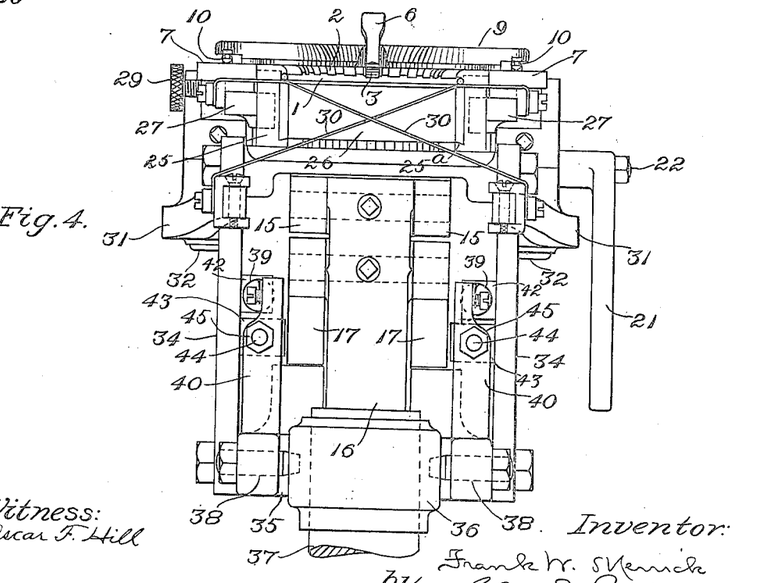
Fig. 4, Sheet 3, is an elevation of the said devices, loooking at the inner end thereof.

A removable wiping-band adapted to serve also as a binder, and which is of the order of that previously mentioned herein as a feature of the invention, is represented at 1 in Figs. 2, 3, and 4. The said wiping-band is flexible and pliable, to enable it to be bent into substantially U-shape in applying it to the wiper-devices with which it is used, and also enable it to be bent to a further extent in gathering inward the projecting marginal portions of a shoe-upper and binding them against the shoulder of the shoe-insole. Preferably, the said wiping-band and binder is composed of a rod or strip of raw-hide of suitable length.

Figure 1:
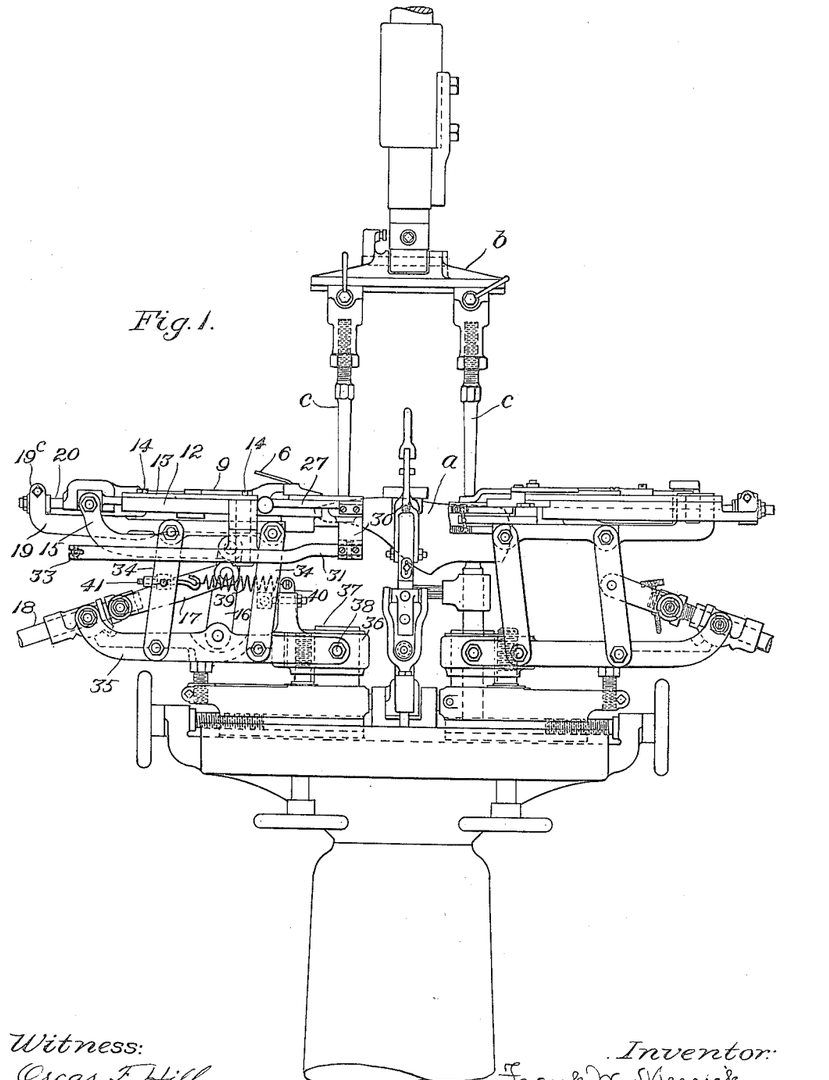
Figure 1 shows in side elevation the parts aforesaid of a lasting machine substantially like that of the application aforesaid, including an embodiment of the present improvements.

The construction and arrangement of the wiper-devices, and the mode and means of combining the wiper-band with such devices and causing it to perform the contemplated functions, may be varied in practice. In the illustrative embodiment of the invention that is shown in the drawings, the wiper-devices include a chain-wiper 2 with which the wiping-band 1 is combined in practice in a manner to act as the working face thereof as the last $a$, Fig. 1, with shoe thereon is forced down within the circle or nest of lasting devices by the descent of the vertically-movable depressor and hold-down $b$, which applies pressure to the last and shoe by means of its downwardly-projecting fingers $c, c$. Preferably, for the reception and support of the wiper-band 1 the links of the chain-wiper 2 are furnished, on the sides thereof which face toward the position of the last and shoe, with upper and lower lips, as shown best in Figs. 2 and 3, the alined series of recesses between the lips of the respective links of the chain constituting a groove-like seat into which the wiping-band may be entered as in the said figures. This groove-like seat for the removable wiper-band is in itself one of the specific features of the invention. Suitable means for preventing accidental dislodgment of the wiping-band from the said seat is provided, usually a catch or detent. At 3, Figs. 2, 3, 4 a convenient spring catch for such purpose is shown, it consisting of a flexible strip of spring-material that is attached by one end thereof to a small block or strip 4 occupying a seat 5 in the middle block or link $2^a$ of the chain-wiper. The downturned curved free end of the spring catch is adapted to engage with the bent middle portion of the wiping-band in the manner shown in Fig. 3, to hold it within the seat. A tail 6 attached to the spring catch, and extending upwardly and outwardly beyond the point of attachment of the spring catch to the supporting-strip 4, constitutes an operating lever for the spring catch. By pressing down upon this tail the engaging end of the catch may be tilted upward to permit a wiping-band 1 to be introduced into its seat, or to permit a wiping-band occupying the seat to be removed from the latter, as, for instance, after the wiping operations have been completed and the wiping-band has been attached to the shoe to serve as a toe-binder. When the pressure upon the tail of the catch is relieved, the catch will spring down toward normal position again, and if a fresh wiping-band has been placed in the seat, the catch will engage with such wiping-band to keep it securely in place. The combination of a wiping-band holding catch with the seat for the wiping-band is one of the specific features of the invention.

Figures 8, 9:
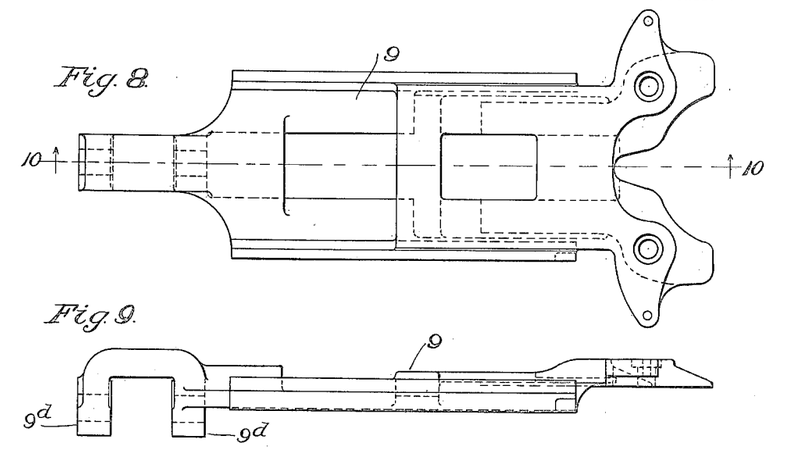
Fig. 8, Sheet 5, is a plan view of the wiper-slide.
Fig. 9, same sheet, is an edge view thereof.
Figure 10:
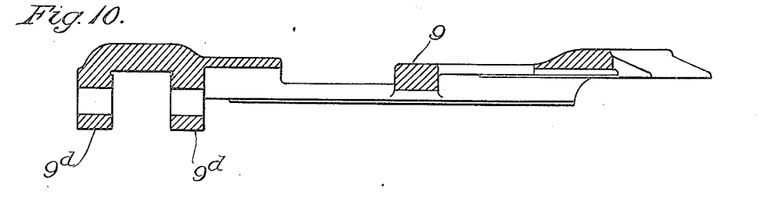
Fig. 10, same sheet, is a longitudinal vertical section thereof.
Figure 11:
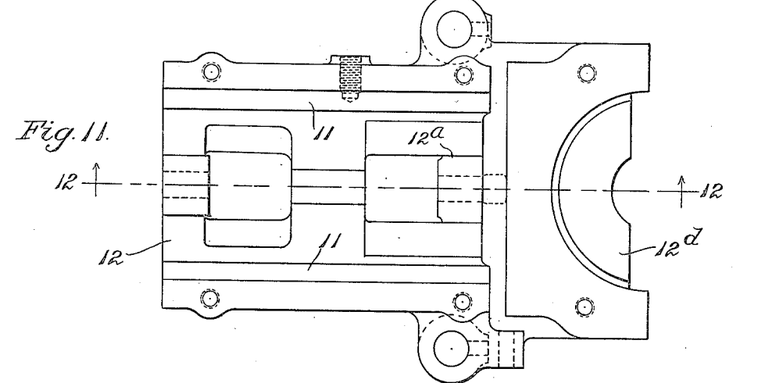
Fig. 11, Sheet 6, is a plan view of the wiper-slide carrier, and Fig. 12, same sheet, is a view thereof in section in the plane indicated by dotted line 12, 12, in Fig. 11.
Figure 12:
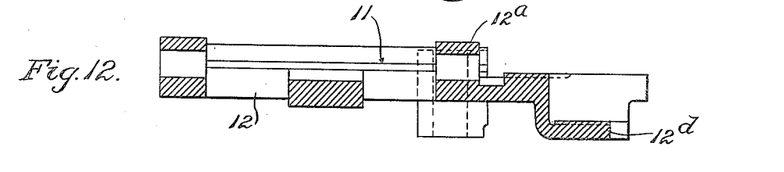
Figure 13:
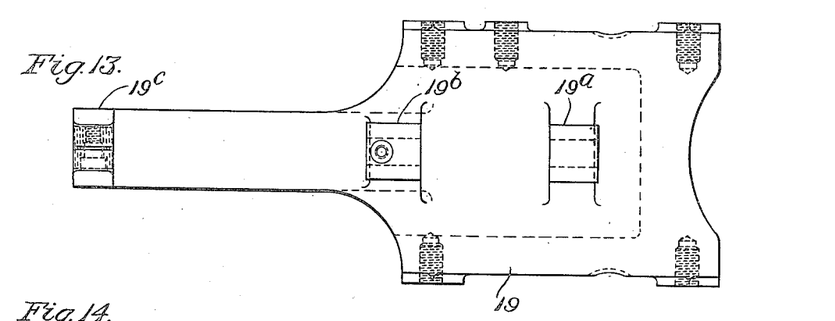
Fig. 13, Sheet 6, is a plan view of the support for the wiper-slide carrier, and Fig. 14, same sheet, is a side elevation of the said support.
Figure 14:
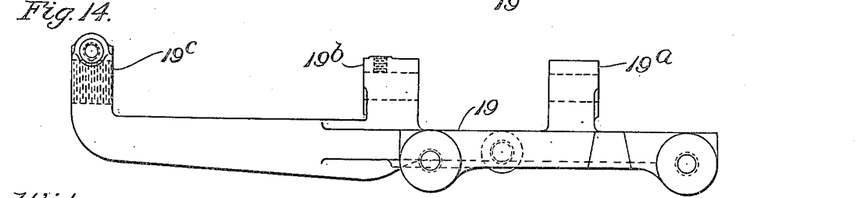

The actuation of the chain-wiper 2, for the purpose of causing it to move inward over the insole so as to complete the wiping operation and effect the crimping, is provided for in the illustrated mechanism, substantially as in the machine of the application aforesaid, by connecting the opposite end-links $2^b, 2^b$, of the chain-wiper by means of pivots $2^c, 2^c$, to the free extremities of swinging arms 7, 7, shown best in Fig. 2, which at their inner ends are connected by pivots 8, 8, with the inner end of a wiper-slide 9. The said wiper-slide is shown in combination with the associated parts in Figs. 1, 2, and 3, and separately in Figs. 8, 9 and 10, sheet 5. Contracting spiral springs 10, 10, Figs. 2 and 3, respectively extending from the respective arms 7, 7, to opposite lateral projections or ears with which the inner end of the wiper-slide is furnished, act with a tendency to swing the arms outward away from each other, and normally keep the arms and the ends of the chain-wiper spread apart, as in Fig. 2. The constructional features providing for the support, etc., of the chain-wiper, as well as for that of the wiper-slide, and for guidance of the wiper-slide as it is moved lengthwise, may vary in practice. The wiper-slide in this instance has its side-edges fitted to guides 11, 11, Fig. 6, sheet 4, which are formed upon the side-margins of a carrier 12. Said carrier is shown in combination with the associated parts in Figs. 3 and 6, and separately in Figs. 11 and 12, sheet 6. The said side-edges of the wiper-slide are confined to the said guides by means of gibs 13, 13, Fig. 2, which are attached to the side-margins of the carrier by means of screws 14, 14. The means provided in this instance for enabling the wiper-slide to be moved endwise upon the carrier comprises a link 15 which at one end thereof is engaged by means of center screws 151, 151, with a block 152, Fig. 3, occupying the space between two depending lugs $9^d, 9^d$, at the outer end of the wiper-slide 9, an upright swinging arm 16 with which the other end of the link 15 is connected pivotally, connecting-links 17, 17, which are engaged by their inner ends with the said arm 16, and an actuating hand-lever 18 with which the outer ends of the said link are engaged. By manually operating the said lever 18 the wiper-slide is actuated.

Figure 6:
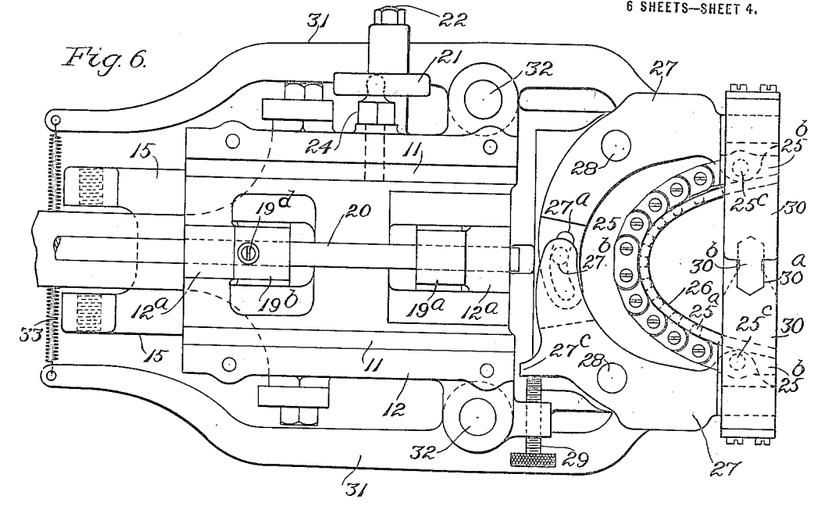
Fig. 6, Sheet 4, is a plan view of the said devices with the wiper and wiper-slide removed.
Figure 7:
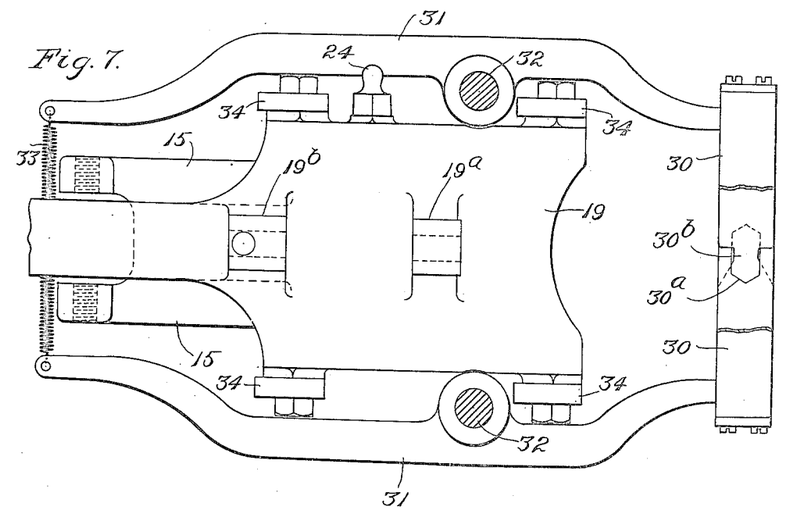
Fig. 7, Sheet 4, is a plan view of the carriage and associated parts after removal of the wiper, wiper-slide, end-band, and end-band carrier, with the pivots of the girth-carrying levers in horizontal section.

The wiper-slide carrier 12, in turn, is mounted upon a support 19, shown in Fig. 3, on Sheet 2, and in Fig. 7, on Sheet 4, in a manner which permits the carrier to be rocked sidewise, as usual, to suit the twist of the last, so that the wiping-elements may operate in a plane parallel with the surface of the fore-part of the last. Herein, as heretofore, the rocking adjustment is provided for by mounting the carrier 12 upon a rod 20 which is carried by the said support 19 and extends in the direction of the length of the support and carrier. This rod is fitted to guides that are provided in connection with upstanding lugs 19ª, 19ᵇ, 19ᶜ, of the support 19, and is held from movement lengthwise relative to the said support in convenient manner, as for instance, by means of a clamping-screw 19ᵈ, Figs. 2 and 3, applied to the lug 19ᵇ and engaging by its inner end with the rod. The wiper-slide carrier 12 in this instance is mounted upon the rod 20 by means of bearings 12ª, 12ª, with which it is furnished, and which fit the said rod with capacity to turn thereon. The lugs 19ª, 19ᵇ, enter between the said bearings 12ª, 12ª, as shown in Figs. 2, 3, and 6, and by their engagement with such bearings as in the said figures prevent the carrier 12 from moving lengthwise independently of support 19.

The rod 20 passes through the lugs 9ᵈ, 9ᵈ, of the wiper-slide and the block 15² between such lugs, as shown in Fig. 3.

Figure 5:
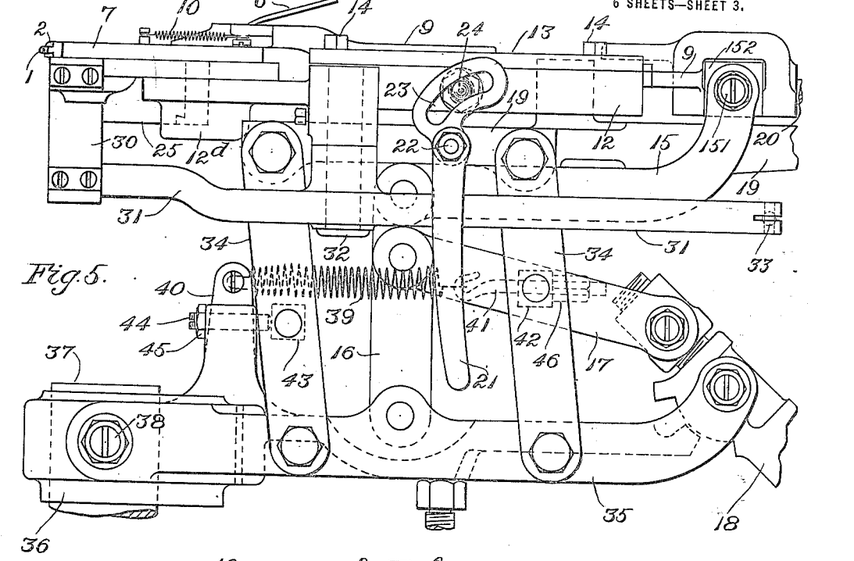
Fig. 5, Sheet 3, is a side elevation thereof, viewing the side opposite that shown in Fig. 1.

As a feature of improvement, I provide an adjusting lever 21, shown best in Figs. 4 and 5, Sheet 3, by means of which the carrier 12 may be rocked with convenience and precision into the required angular position. In this embodiment of the invention the adjusting lever 21 serves to lock the carrier 12 in the angular position which has been given to it, until the angle is altered by movement manually given to the adjusting lever. The said lever is mounted by means of a pivot 22 upon one edge of carrier 19 upon which it turns somewhat stiffly, and is formed with a cam-slot 23 into which a pin or stud 24 projecting from one edge of the wiper-slide carrier 12 enters. When the lever 21 is swung by an operator around its supporting pivot 22, the walls of the cam-slot 23 act upon the pin or stud 24 to rock the said carrier upon the axial support 20. When the adjustment has been effected, the engagement of the said walls with the pin or stud tends to prevent accidental change of the angular position of the carrier 12.

The carrier 12 serves to support the toe-band 25, Fig. 6, and also the toe-girths, and the parts with which the toe-band and toe-girths are connected. For the reception of the toe-band 25, the carrier 12 is formed at its inner end with a shelf 12ᵈ, Fig. 3, and Figs. 11 and 12 on Sheet 6, which is dropped somewhat so as to provide space for the accommodation of the toe-band upon the said shelf, between the latter and the underside of the chain-wiper 2, as shown in Fig. 3. The toe-band is composed as usual of a chain of links provided with a facing-strip 26, Figs. 3 and 6, of leather for contact with the toe-portion of the upper of the shoe that is being lasted. A feature of improvement constituting the subject-matter of a divisional application, consists in forming the said links with inwardly extending projections 25ª, 25ª, at their lower ends, as shown in Fig. 3, constituting a support for the facing-strip, the said projections being recessed at their tops so that the alined series of recesses constitutes a seat for the lower edge of the said leather band, whereby the said band is kept in place upon the links. As shown in Fig. 6, Sheet 4, the opposite end-links 25ᵇ, 25ᵇ, of the toe-band 25 are connected by means of pivots 25ᶜ, 25ᶜ, to the rear arms of levers 27, 27, which in turn are mounted by means of pivots 28, 28, upon the inner end-portion of carrier 12 with capacity to swing transversely in a horizontal or substantially horizontal plane. I have connected the said levers together in such manner as to cause them to swing in unison but in opposite directions around their respective pivots in being changed in position with relation to each other. In this instance the said connection is established by means of a curved slot 27ª formed in the tail-portion of one of the said levers and a stud or pin 27ᵇ carried by the tail of the other thereof and working in the said slot. The approach of the inner arms of the said levers to each other is limited by suitable adjusting means, which latter enables the closeness of such approach to be regulated at will. I have shown in Fig. 6, an adjusting contact-screw 29 having its threaded stem fitted to a screw-threaded opening that is tapped in a projecting portion of the carrier 12, and arranged to engage by its inner end with a projection 27ᶜ extending from one of the levers 27. The illustrated construction and arrangement permits the side-portions of the U-shaped toe-band to be forced apart by the entrance of the fore-part of a lasted shoe between them; but places an adjustable limit upon the approach of such side-portions toward each other.

In conjunction with the toe-band 25 I employ girth-bands 30, 30. Each of these is connected by one end thereof with the rear end of one of the levers 27, 27. The toe-girth-bands extend transversely in opposite directions, and cross each other as shown best in Fig. 4, Sheet 3, one thereof being slotted as at 30ª and the other being arranged to pass through the slot, the intermediate portion of the said second girth-band which occupies the slot being of reduced width. The lower ends of the girth-bands are connected at opposite sides of the lasting devices to the extremities of the rear arms of oppositely-located horizontal levers 31, 31, which are mounted upon vertical pivots 32, 32, projecting down from the sides of the wiper-slide carrier 12. The forwardly-extending arms of the said levers are connected together by means of a contracting spiral spring 33, Figs. 2, 6, and 7, which acts with a tendency to draw such arms toward each other so as to spread apart the rearwardly-extending arms of the levers and thereby strain the girth-bands taut and keep them under tension, as well as keep the sides of the toe-band drawn inward toward each other and the projection 27ᶜ aforesaid of one of the levers 27 in engagement with the adjustment-screw 29. The tension of the girth-bands operates with a tendency to keep the sides of the toe-band in close contact with the upper at the sides of the last as the lasted shoe is forced down by the action of the depressor or hold-down. The pressure of the lasted shoe against the girth-bands also acts through the latter with a tendency to hold or draw the said sides inward. The spreading apart of the sides of the toe-band operates to move the girth-bands in a manner to cause such bands to act with a wiping action upon the upper.

The support 19 to which reference has been made is a carriage which is so mounted as to render it capable of longitudinal movement toward and from the position of the last. As in the machine of the application aforesaid, it is supported by means of two pairs of upright parallel-links 34, 34, upon a mounting 35. The said mounting, in its turn, is combined with the collar 36 upon the supporting post 37, its forked inner end being connected pivotally with the said collar by means of a pair of oppositely located screw-pivots 38, 38, applied in connection with the branches of the fork. This mode of connecting the mounting with the collar enables the mounting to be swung up or down so as to adjust the plane of the wiper-devices with reference to the horizontal to suit the spring of the forepart of the last. The collar is adapted to turn around the supporting post, to enable the lasting-devices to be swung transversely to suit the swing of the forepart of the last. The carriage 15 is held normally in its inward position by the tension of contracting spiral springs 39, 39, each having one end thereof engaged with a post 40 rising from the mounting 35 and the other end thereof engaged with a hook 41 combined with a block 42 carried by one of the links 34, 34, of one pair. The said inward position is determined by the contact of blocks 43, 43, that are carried by the links of the other pair, with longitudinally adjustable stop-screws 44, 44, carried by the posts 40, 40. A check-nut 45 applied to each of the said stop-screws prevents accidental loss of adjustment thereof. A nut 46 applied to the threaded stem of each hook 41 outside the corresponding block 42 serves as a means of adjusting the hook lengthwise to vary the tension of the corresponding spring.

I claim as my invention:—

1. In end-lasting mechanism, the combination with wiper-devices, of a flexible wiping-band adapted to be combined removably with such devices for the wiping operation, which engages with the upper to effect the wiping thereof, and which is adapted to remain applied to the shoe as a binder.

2. In end-lasting mechanism, the combination with wiper-devices, of a flexible wiping-band of raw-hide adapted to be combined removably with such devices for the wiping operation, which engages with the upper to effect the wiping thereof, and which is adapted to remain applied to the shoe as a binder.

3. The improvement in the method of lasting which consists in employing a removable, flexible, wiping-band as the working face of the wiper-devices employed in end-lasting a shoe and by means of the said band wiping the shoe-upper into place around the end of the last, and then fastening the said wiping-band to the shoe so that it constitutes a binder for the shoe-upper.

4. In end-lasting mechanism, a chain-wiper composed of a series of links jointed to one another, having a groove-like wiping-band seat in the said links thereof, and a flexible wiping-band adapted to be applied to the said seat to serve as the working face of the said chain-wiper, and by engagement with the upper to effect the wiping thereof, and which is adapted to be removed from the lasting mechanism with the lasted shoe.

5. In end-lasting mechanism, a chain-wiper having a groove-like wiping-band seat in the links thereof, a flexible wiping-band adapted to be applied to the said seat to serve as the working face of the said chain-wiper, and also adapted to be removed from the lasting mechanism with the lasted shoe, and a catch or detent for holding the wiping-band in place for the wiping operation.

6. In end-lasting mechanism, a chain-wiper having its links furnished with upper and lower lips, with an alined series of recesses between such lips constituting a groove-like seat, and a wiping-band adapted to be applied to the said seat to serve as the working face of the said chain-wiper and also adapted to be removed from the lasting mechanism with the lasted shoe.

7. In end-lasting mechanism, a chain-wiper having its links furnished with upper and lower lips, the alined series of recesses between such lips constituting a groove-like seat, a wiping-band adapted to be applied to the said seat to serve as the working face of the said chain-wiper and adapted also to be removed from the chain-wiper with the lasted shoe, and a catch or detent for holding the wiping-band in place for the wiping operation.

8. In end-lasting mechanism, the combination with end-wiper devices, an end-wiper slide, a carrier for said slide, and a longitudinally-movable carriage on which said carrier is mounted with capacity to rock transversely, of a slotted-cam lever combined with said carriage and carrier to adjust the carrier at the proper degree of transverse inclination to enable the end-wiper devices to conform to the twist of the last, and also lock the carrier in the desired angular or inclined position.

9. In end-lasting mechanism, in combination, an end-band, levers having rearwardly-extending arms with which opposite ends of the end-band are connected and secondary arms which are connected together to cause equalized unison swinging movement of the two levers, and adjusting means for regulating the closeness of approach of the opposite sides of the end-band toward each other.

10. In end-lasting mechanism, in combination, an end-band, levers having rearwardly-extending arms with which opposite ends of the end-band are connected and secondary arms which are connected together to cause unison swinging movements of the two levers, and an adjustment screw combined with one of said levers by which the closeness of approach of the opposite sides of the end-band toward each other may be controlled.

11. In end-lasting mechanism, in combination, an end-band, levers having rearwardly-extending arms with which opposite ends of the end-band are connected, and elastically-tensioned girth-bands which are connected with the opposite side-portions of the said end-band and which operate with a tendency to draw such side-portions toward each other.

12. In end-lasting mechanism, in combination, an end-band, girth-bands connected respectively with opposite sides of the open end-band and crossing each other between such sides, and tension-means acting through said girth-bands with a tendency to draw the sides of the end-band toward each other.

13. In end-lasting mechanism, in combination, an end-band, girth-bands connected respectively with opposite sides of the open end-band and crossing each other between such sides, tension-means acting through said girth-bands with a tendency to draw the sides of the end-band toward each other, and adjusting means to vary the approach of the sides of the end-band toward each other.

14. In end-lasting mechanism, in combination, an end-band, levers connected to move oppositely in unison and having the sides of the end-band operatively connected therewith, means to adjust the approach of the sides of the end-band toward each other, and elastically-tensioned crossing-girth-bands connected with the said sides.

15. In end-lasting mechanism, in combination, an end-band, levers connected together to move oppositely in unison and having the sides of the end-band respectively connected therewith, means to adjust the approach of the sides of the end-band toward each other, crossing girth-bands connected with the said sides, and spring-actuated levers with which such girth-bands are connected also.

In testimony whereof I affix my signature in presence of two witnesses.

FRANK W. MERRICK.

Witnesses:
CHAS. F. RANDALL,
ELLEN O. SPRING.